(12) United States Patent
Hunt et al.

(10) Patent No.: US 10,209,675 B2
(45) Date of Patent: Feb. 19, 2019

(54) METHODS, SYSTEMS AND APPARATUSES FOR OPTICALLY ADDRESSED HOLOGRAPHIC IMAGING SYSTEM

(71) Applicant: THE BOEING COMPANY, Chicago, IL (US)

(72) Inventors: Jeffrey H. Hunt, Thousand Oaks, CA (US); Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 144 days.

(21) Appl. No.: 15/083,589

(22) Filed: Mar. 29, 2016

(65) Prior Publication Data
US 2017/0285572 A1    Oct. 5, 2017

(51) Int. Cl.
*G03H 1/00* (2006.01)
*G03H 1/08* (2006.01)
*G03H 1/22* (2006.01)

(52) U.S. Cl.
CPC ......... *G03H 1/2294* (2013.01); *G03H 1/0005* (2013.01); *G03H 1/0891* (2013.01); *G03H 1/2249* (2013.01); *G03H 2001/2263* (2013.01); *G03H 2225/25* (2013.01); *G03H 2260/50* (2013.01)

(58) Field of Classification Search
CPC .................................. H04N 5/74; H01J 65/042
See application file for complete search history.

(56) References Cited

U.S. PATENT DOCUMENTS

| 3,875,442 | A | 4/1975 | Wasa et al. |
| 6,366,388 | B1 | 4/2002 | Hampp |
| 2001/0005114 | A1 | 6/2001 | Jacobsen et al. |
| 2006/0132472 | A1 | 6/2006 | Peeters et al. |
| 2007/0206258 | A1 | 9/2007 | Malyak et al. |
| 2008/0218434 | A1 | 9/2008 | Kelly et al. |
| 2013/0094069 | A1 | 4/2013 | Lee et al. |
| 2014/0375763 | A1* | 12/2014 | Lee .......................... G03H 1/02 348/40 |

* cited by examiner

*Primary Examiner* — Kimberly N. Kakalec
(74) *Attorney, Agent, or Firm* — Coats & Bennett, PLLC (57) ABSTRACT

Methods and systems and components made according to the methods and systems, are disclosed relating to the generation of a holographic image, including a color-containing holographic image, generated exclusively optically addressing information to a projection system.

13 Claims, 7 Drawing Sheets

METHODS, SYSTEMS AND APPARATUSES FOR OPTICALLY ADDRESSED HOLOGRAPHIC IMAGING SYSTEM

TECHNOLOGICAL FIELD

The present disclosure generally relates to the field of image display. More particularly, the present disclosure relates to the field of addressed light, particularly optically addressed light for the purpose improving holographic imaging displays, apparatuses, systems and methods.

BACKGROUND

Images are typically created on a display by electrically addressing light, for example via a spatial light modulator, images are created and changed electronically and projected onto electronic displays. A spatial light modulator (SLM) is an object that imposes some form of spatially varying modulation on a beam of light. Usually a SLM modulates the intensity of the light beam, although devices are known that modulate the phase of the beam or both the intensity and the phase simultaneously. Nevertheless, known imaging devices rely on electronically addressing inputs. Such electrically addressed inputs realize practical limitations relative to scale. That is, for example, known electrically addressed imaging systems must use projection means of a certain minimum size or otherwise realize various system constraints relative to image delivery and performance. This inability to miniaturize imaging systems has restricted the advancement of imaging devices relative not only to size, but also in terms of intensity, resolution, color, etc.

In addition, the technology relating to the projection of realistic holograms to date has been cumbersome and not entirely useful or reliable. While so-called optically addressed imaging systems are known using optically addressable electrophoretic displays, or optically addressed spatial light modulation, such imaging systems also incorporate electrical components that, again, place scale, quality and other restrictions on the overall imaging system.

BRIEF SUMMARY

The present disclosure relates to methods, systems and apparatuses for exclusively addressing electronic media optically.

According to one aspect, a method is disclosed for addressing a projection system comprising: positioning an electro-optical device for inputting information to a projection system; applying a voltage across the projection system device, with the voltage generated by voltage-generating device; generating plasma in a plasma-containing device; generating a plurality of write beam frequencies from the electro-optical device; directing the write beam frequencies to interact with the plasma in the plasma-containing device; generating a plurality of write beams with each write beam having a phase value, with each phase value being different; generating a coherent read beam from a coherent read beam-generating source; controlling the write beam frequencies independently from the read beam; generating predetermined phase values; and generating a holographic image, wherein the write beams are exclusively optically addressed from the electro-optical device to the plasma-containing device.

In a further aspect, information is exclusively optically addressed to the plasma-containing device via the write beams.

Another aspect is directed to a holographic image generated by exclusively optically addressing information from an electro-optical device to a projection system comprising a plasma-containing device.

In another aspect, the electro-optical device is a laser and the write beams are emitted from the laser.

Another aspect further comprises, coincidently with the step of generating a holographic image, the step of assigning color to the holographic image by modulating the different write beam frequencies in phase separately in the wavefront.

In yet another aspect, the holographic image comprises a plurality of colors.

A further aspect of the present disclosure is directed to a projection system comprising, the projection system comprising: an electro-optical device configured to input information to a plasma-containing device; a voltage-generating source in communication with the plasma-containing device; a plurality of write beam frequencies generated by the electro-optical device, with the plurality of write beam frequencies each configured to interact with the plasma-containing device to generate a plurality of write beams having a plurality of phase values, with each phase value being different from one another; a coherent read beam generated from a coherent read beam source; a first controller configured to control the phase values to produce predetermined phase values in a phase modulated beam; a second controller configured to control the write beam, the second controller configured to operate independently from the first controller; wherein the information is configured to be generated exclusively optically from the electro-optical device to the plasma-containing device, and the exclusively optically addressed information is configured to generate a holographic image.

In a further aspect, information is exclusively optically addressed to the projection system device via the write beams.

In another aspect, the electro-optical device is a laser and the write beams are emitted from the laser.

In a further aspect, exclusively optically addressed information is configured to assign at least one color to the holographic image.

Yet another aspect is directed to an object comprising a projection system comprising: an electro-optical device configured to input information to a projection system, with the projection system comprising a plasma-containing device; a voltage-generating source in communication with the plasma-containing device; a plurality of write beam frequencies generated by the electro-optical device, with the plurality of write beam frequencies each configured to interact with plasma in the plasma-containing device to create a plurality of write beams having a plurality of phase values, with each phase value being different from one another; a coherent read beam produced by a coherent read beam source; a first controller configured to control the phase values to produce predetermined phase values; a second controller configured to control the write beam, the second controller configured to operate independently from the first controller; wherein the information is configured to be exclusively optically addressed from the electro-optical device to the plasma-containing device, and the optically generated information is configured to generate a holographic image.

In yet another aspect, a stationary object comprises the exclusively optically addressable projection system comprising an electro-optical device configured to exclusively optically address information to a projection system.

In another aspect, a vehicle comprises the optically addressable projection system comprising an electro-optical device for exclusively optically addressing information to a projection system.

In further aspects, vehicles that comprise an exclusively optically addressable projection system comprising an electro-optical device for inputting information to a projection system include: a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface water borne vehicle, an unmanned surface water borne vehicle, an unmanned sub-surface water borne vehicle, a manned sub-surface water borne vehicle or combinations thereof.

According to a further aspect, a method is disclosed for addressing a projection system comprising: positioning an electro-optical device for inputting information to a projection system, with the projection system comprising a solid state device; applying a voltage generated by a voltage-generating device across the solid state device, generating a plurality of write beam frequencies from the electro-optical device; directing the write beam frequencies to interact with the solid state device; generating a plurality of write beams with each write beam having a phase value, with each phase value being different from one another; generating a coherent read beam from a coherent read beam-generating source; controlling write beams independently from the read beam; generating predetermined phase values; and generating a holographic image, wherein the write beams are exclusively optically addressed from the electro-optical device to the solid state device.

In a further aspect, information is exclusively optically addressed to the solid state device via the write beams.

Another aspect is directed to a holographic image generated by exclusively optically addressing information from an electro-optical device to a projection system comprising a solid state device.

In another aspect, the electro-optical device is a laser and the write beams are emitted from the laser.

Another aspect further comprises, coincidently with the step of generating a holographic image, the step of assigning color to the holographic image by modulating the different write beam frequencies in phase separately in the wavefront.

In yet another aspect, the holographic image comprises a plurality of colors.

In yet another aspect, the solid state device comprises a semiconductor material.

Yet another aspect is directed to an object comprising a projection system comprising: an electro-optical device configured to input information to a projection system, with the projection system comprising a solid state device; a voltage-generating source in communication with the solid state device; a plurality of write beam frequencies generated by the electro-optical device, with the plurality of write beam frequencies each configured to interact with the solid state device to create a plurality of write beams having a plurality of phase values, with each phase value being different from one another; a coherent read beam produced by a coherent read beam source; a first controller configured to control the phase values to produce predetermined phase values in a phase modulated beam; a second controller configured to control the write beam, the second controller configured to operate independently from the first controller; wherein the information is configured to be addressed exclusively optically from the electro-optical device to the solid state device, and the optically generated information is configured to generate a holographic image.

In yet another aspect, a stationary object comprises the exclusively optically addressable projection system comprising an electro-optical device configured to exclusively optically address information to a projection system.

In another aspect, a vehicle comprises the optically addressable projection system comprising an electro-optical device for exclusively optically addressing information to a projection system.

In further aspects, vehicles that comprise an exclusively optically addressable projection system comprising an electro-optical device for inputting information to a projection system include: a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface water borne vehicle, an unmanned surface water borne vehicle, an unmanned sub-surface water borne vehicle, a manned sub-surface water borne vehicle or combinations thereof.

In yet another aspect, a stationary object comprises an exclusively optically addressable projection system comprising an electro-optical device for exclusively optically addressing information to a projection system.

In another aspect, a vehicle comprises the optically addressable projection system comprising an electro-optical device for exclusively optically addressing information to a projection system.

In further aspects, vehicles that comprise an exclusively optically addressable projection system comprising an electro-optical device for inputting information to a projection system comprise: a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface and/or sub-surface water borne vehicle, an unmanned surface and/or sub-surface water borne vehicle or combinations thereof.

In a further aspect, the present disclosure is directed to a method for addressing a projection system comprising: positioning an electro-optical device for optically addressing a projection system; with the projection system comprising a solid state device; applying a voltage-generating source in communication with the solid state device; generating a write beam in the electro-optical device; directing the write beam to a predetermined location in the solid state device; and generating a pixelated output in the solid state device, with the optically generated information configured to generate a holographic image, and with the holographic image comprising predetermined colors.

In another aspect, the present disclosure is directed to a projection system comprising an electro-optical device configured to produce a write beam and optically address a projection system output, with the projection system output comprising a solid state device; and a voltage-generating source in communication with the solid state device, wherein the input information is configured to generate photonic excitation at predetermined pixel locations in the solid state device, with optically generated information configured to generate a holographic image, and with the holographic image comprising predetermined colors.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

An imaging system that is completely optically addressed would significantly improve imaging system flexibility including, but not limited to, image contrast, image quality, image presentation, image accuracy/reproducibility, image variation color selection, image intensity, image resolution (e.g. sharpness), image projection device scale and image projection display scale, reduction in device complexity, etc.

Aspects of this disclosure are directed to projection or image-producing methods, systems and apparatuses, including architecture for addressing a plasma-based or solid-state-based projection or image-producing system in an all optical, or exclusively optical fashion. The term "addressing" means that the information input to, and output from the display (plasma tube or solid-state device) is completely and exclusively optical (e.g. electromagnetic radiation) in its physical nature. Such exclusively optical addressing is significantly distinct from the known systems where information for image projection and display is provided electronically, with an optical output only. According to aspects of the present disclosure, "optically addressed" information is delivered to a display (e.g. projector, etc.) exclusively optically, and such information is not delivered to a display electrically, as is presently the case with typical display systems.

According to further aspects of the present disclosure, an optical beam, such as, for example, one emitted from a laser, is understood to be a well-defined beam in its propagation characteristics; (e.g. an optical beam having a well-defined wavefront, and well-defined spectral characteristics). While the spectrum does not have to be narrow, the useful spectral characteristics are understood to be substantially constant. While beams emitted from laser sources satisfy the above criteria, non-laser (e.g. non-coherent) sources that satisfy the above criteria are also contemplated according to aspects of the present disclosure.

Figure 1:
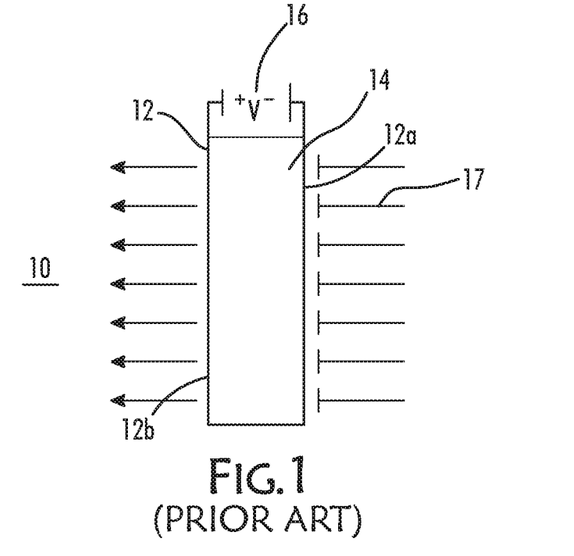
FIG. 1 is schematic diagram of an Prior Art device showing electrically addressing an imaging display.

For example, For example, FIG. 1 shows a schematic representation of a Prior Art projection system 10 showing a device that is electrically addressed. In FIG. 1, a plasma tube 12 is shown in a side view. The volume of this tube contains a gas 14. Such gas 14 has a voltage 16 placed across it. The voltage dissociates enough for electrons from the gas to enable the tube contents to behave as a plasma. In order to generate the individual pixels for projecting an image, individual electrical elements 17 are attached to the back side 12a of the plasma tube 12. While shown as a single row, it is understood such electrical elements may be dispersed in two dimensions (e.g. also perpendicular to the drawing sheet). The electrical elements 17, acting individually, both for position and color, have voltages applied to them. When the voltages are sufficient to dissociate electrons from the gas, the associated electric field will create a current through the plasma, generating a light signal (e.g. the projected image that is emitted from the front side 12b of the plasma tube 12) represented in FIG. 1 as arrows pointing to the left. In this format as shown in FIG. 1 and described above, the plasma tube 12 is said to be "electronically addressed" in the sense that the information concerning the desired image is carried electrically to the plasma tube.

Figure 2:
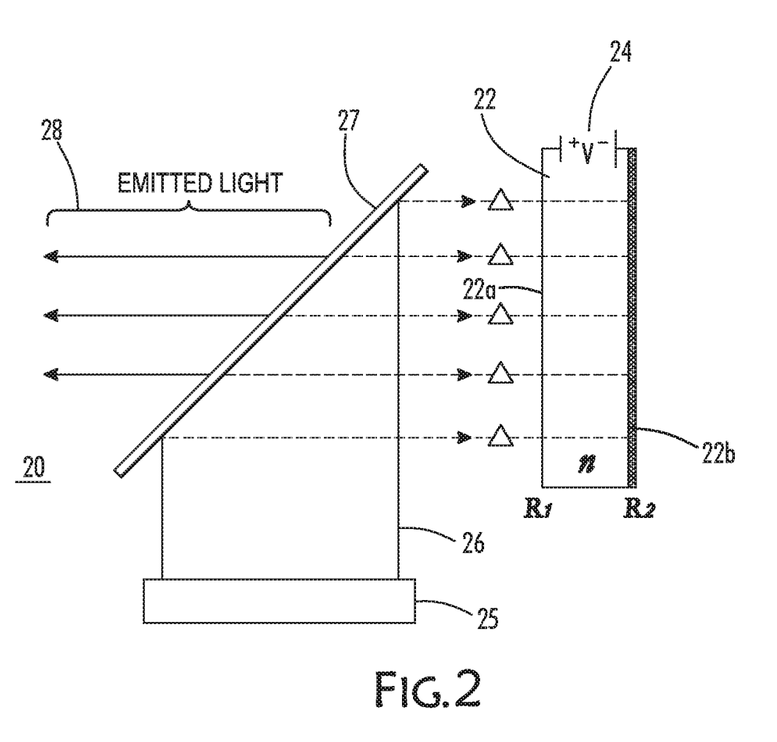
FIGS. 2 and 3 are schematic diagrams showing an aspect of the present disclosure where a plasma-containing projection device is exclusively optically addressed.

FIG. 2 is a schematic representation of an exclusively optically addressed projection system 20 according to aspects of the present disclosure. In FIG. 2 a plasma tube 22 is shown in a side view having a voltage from a voltage generating source 24 applied across the plasma tube 22. The voltage is applied across the plasma tube 22 to provide a sufficiently large electric field in the plasma tube 22 to generate a plasma. According to the projection system 20, plasma tube 22 comprises a back reflective surface 22a and a front reflective surface 22b. The reflectivities of the surfaces 22a and 22b are based on the desired application and system. However, generally, the reflectivities of the surfaces 22a and 22b are greater than about 90%, and ranging from about 90% to about 99.9%, and more preferably for aspects of the present disclosure from about 90% to about 95%. According to aspects of the present disclosure, if the front and back reflective surfaces of the plasma tube 22 are optically flat and substantially parallel to one another, the plasma tube with surfaces 22a and 22b will behave like a Fabry-Perot interferometer, with a reflected optical pattern generated by interference between the front and back surfaces of the plasma tube 22. It is understood that the optical path length associated with the interference depends upon the index of refraction, "n", of the plasma contained within the plasma tube 22. $R_1$ and $R_2$ refer to the reflectivity values of the front and back surfaces of the plasma-containing device respectively. The values are preferably identical or close to identical to achieve optimal performance. However, the "R" values of the front and back surfaces may vary by up to about 5% from one another. According to this aspect of the present disclosure, a "write" beam 26 is directed from a write beam source 25 to a frequency selective beamsplitter 27 that reflects only a predetermined frequency of the write beam 26. The predetermined frequency is selected to be a frequency that can be easily absorbed by the plasma in the plasma-containing device. The frequency depends upon the material present in the plasma. Preferred frequencies according to the present disclosure are typically in the infrared range (e.g. 3 μm or longer) or in the ultraviolet range (e.g. 300 nm or shorter). The infrared values substantially coincide with vibrational excitations in the plasma while the ultraviolet values coincide with electronic excitations. The write beam 26 is created to be "on" or "off" (light of no light) at each x-y position within the cross-section of the write beam 26, depending on the image that needs to be projected. If the write beam 26 is at a frequency where the plasma is strongly absorptive (e.g. in the UV range) the absorption within the plasma will cause a shift in the value of "n", but only at the points (e.g. locations) where there is light in the write beam 26. In this way, the write beam 26 causes a two dimensional modulation in the interference pattern. The change in the interference pattern is then used to establish which plasma pixels will be on and which will be off. As shown in FIG. 2, the projected light from the plasma then exits the projection system to the left as emitted light 28. Since the frequency of the emitted light will be engineered to be lower than the frequency of the write beam 26, it will pass through the beamsplitter 27. In this way, the plasma tube is said to be completely and exclusively optically addressed, in that, the pixels for the projected image are created exclusively by the interaction with the write beam. While there is a voltage present, the voltage only "conditions" the tube to generate plasma no information is provided to the system electrically. When the plasma tube is a glass tube, the reflective surfaces of the plasma tube may be added coatings or coating layers comprising a metal oxide coating, with the reflective surfaces also functioning as electrodes for the plasma production in the tube. With regard to particular examples, the reflective surfaces (22a, 22b) may comprise magnesium oxide, magnesium fluoride, silicon dioxide, tantalum pentoxide, zinc sulfide, titanium dioxide, alone or in combination, etc. Coatings made from these or other materials are contemplated by aspects of the present disclosure and can be used to coat the plasma tube, with the coatings producing a reflectivity ranging from about 90% to about 99.9%, and more preferably, for certain aspects of the present disclosure, from about 90% to about 95%. Such MgO coatings are available from CVI Laser Optics/CVI Melles Griot, Albuquerque, N. Mex. and OCLI (Optical Coatings Laboratory Inc.), Santa Rosa, Calif. According to a further aspect, indium tin oxide (ITO) can be used as a coating for a transparent electrode in the plasma-containing device. The ITO coating has a reflectivity ranging from about 4% to about 6% (about 95% transmissivity), and can be used in combination with other coatings to produce a desired reflectivity ranging from about 90% to about 95%. Further, when a coating is to be deposited onto the plasma-containing tubes described herein, according to further aspects, the coatings are can be deposited onto the tube at thicknesses ranging from about 10 microns to about 100 microns. The plasma tubes may also be made from a material that is itself inherently reflective in the ranges desired.

Figure 3:
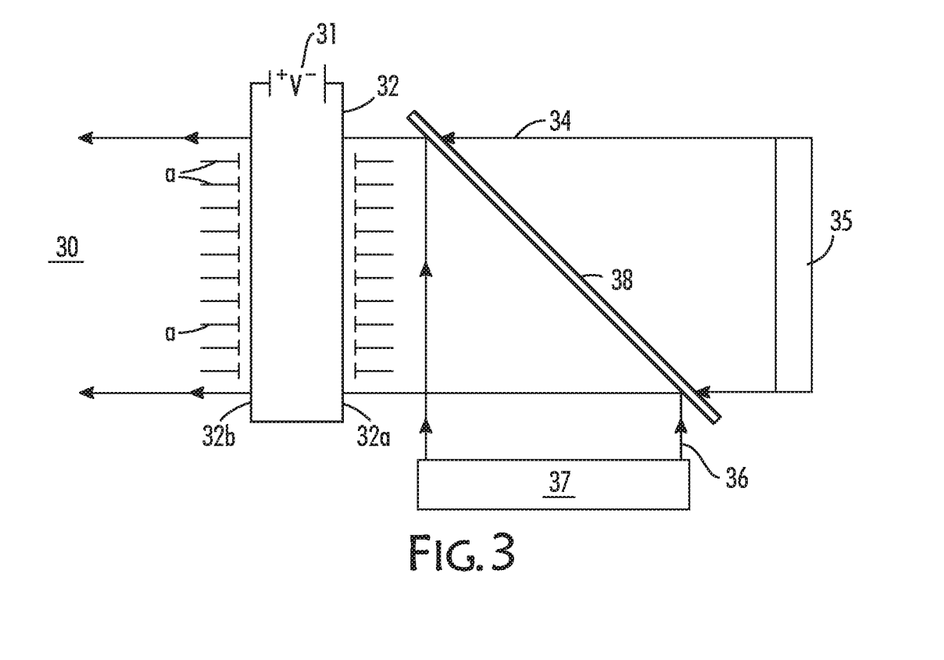

An illustrative projection system 30 is shown in the schematic representation provided as FIG. 3. A plasma tube 32 has a voltage from a voltage generating source 31 applied across the plasma tube 32 comprising back reflective surface 32a and front reflective surface 32b. However, as with the equivalent reflective surfaces disclosed above 22a, 22b, generally, the reflectivities of the reflective surfaces 32a and 32b are greater than about 90%, ranging from about 90% to about 95%, and could go as high as 99% subject only to practical operating parameters of the devices disclosed. Again, according to one illustrative and non-limiting example, the reflective surfaces (32a, 32b) comprise magnesium oxide (MgO) having a thickness ranging from about 10 microns to about 100 microns. A write beam 36 generated from an electro-optical device 37 is coupled into the path of the projection, or "read" beam 34 (generated from a projected beam source 35) with a frequency selective beamsplitter 38. Small electronic connections "a" are shown to the right side of the plasma tube 32. The electronic connections "a" define individual pixels. The write beam 36 modifies the local refractive index as stated above. In this variation, however, care is taken to register the information pixels in the write beam with the electronically connected pixels. The projected image is shown propagating through the beamsplitter 38 and through the plasma tube 32. The write beams 36 and read beams 34 combine in the plasma tube 32. As mentioned above, this variation is specific to situations where it is desirable or necessary to locally control the electric field applied to the plasma tube. Such flexibility may be needed because a particular imaging application requires a stronger non-linear interaction in one area than another. As a result, the effect of the write beam on the refractive index of the material in the plasma tube may require enhanced nonlinearity. In such cases, local electronic pixilation will increase the strength of the non-linear interaction, leading to an enhanced effect on the projected read beam. Such a protocol could also be used to compensate for inconsistencies within either the write beam or read beam, thus alleviating the need for additional optics that could be required to produce a clean wavefront.

In this way, the plasma tube is said to be completely or exclusively optically addressed, in that, the pixels for the projected image are created exclusively by the interaction with the write beam. While there is a voltage present, the voltage only conditions the tube to generate plasma and "condition" the plasma tube and no information is provided to the system electrically.

Further aspects of the present disclosure are directed to, exclusively optically addressed imaging systems for the improved generation of three-dimensional images, including holographic projections, or holograms. Currently known holographic projection schemes are incapable of operating in other than single color modes. In addition, the ability of known hologram systems to perform in real time or in video formats is poor. Typical hologram systems are configured with electronic or mechanical systems causing low resolution, low speed of response resulting in overall images that are poor representatives of reality.

A hologram, or holographic image, is understood to be a photographic recording of a light field rather than of an image formed by a lens, and it is used to display a fully three-dimensional image of the holographed subject, which is seen without the aid of intermediate optics. The hologram itself is not a true "image" and it is usually unintelligible when viewed under diffuse ambient light. A holographic image is an encoding of the light field as an interference pattern of seemingly random variations in the opacity, density, or surface profile of the photographic medium. When suitably lit, the interference pattern diffracts the light into a reproduction of the original light field and the objects that were in it appear to still be there, exhibiting visual depth cues such as parallax and perspective that change realistically with any change in the relative position of the observer. For the purpose of the present disclosure, the terms "hologram", "holographic image" and "holographic projection" are equivalent terms and used interchangeably.

Aspects of this disclosure contemplate a means for generating a three-dimensional (also known as holographic) projection system in an "all optical fashion", with information being exclusively optically addressed. In this case, a hologram is also defined as an image whose wavefront is carefully controlled in a predetermined fashion and engineered in two dimensions to produce a three-dimensional image.

Further aspects contemplate the means for generating a steering mechanism for generating holographic projections. Since a holographic projection is generated by controlling the local phase within a propagating wavefront, it is understood to control the phase of the wavefront in the x-y plane perpendicular to the propagation direction. Typically, this is done by using an electronic device that produces phase "lags" across the wavefront. As has now been determined, and is contemplated and described herein, applying an exclusively optically addressed system for imparting information to the projection device, such as, for example, a plasma-containing or solid state device obviates the known holographic imaging and holographic image quality issues from known holographic systems.

According to aspects of the present disclosure, an optical beam generated from an electro-optical source addresses or writes a phase change within a plasma tube that has an applied electric field or voltage. The write beam, through non-linear optical interaction, alters the local imaginary portion of the complex refractive index. This induced change in the refractive index results in a predetermined modulation in the local phase of a holographic projection beam that then forms the holographic image.

Specifically, consider the propagation equations that accompany electromagnetic radiation. The form of the plane wave is $e^{kx-i\omega t+i\phi}$. Here, $\phi$ represents the phase term accompanying the plane wave. Holograms are coherent projections, in that the phase is well controlled, both in space and time.

Figure 4A:
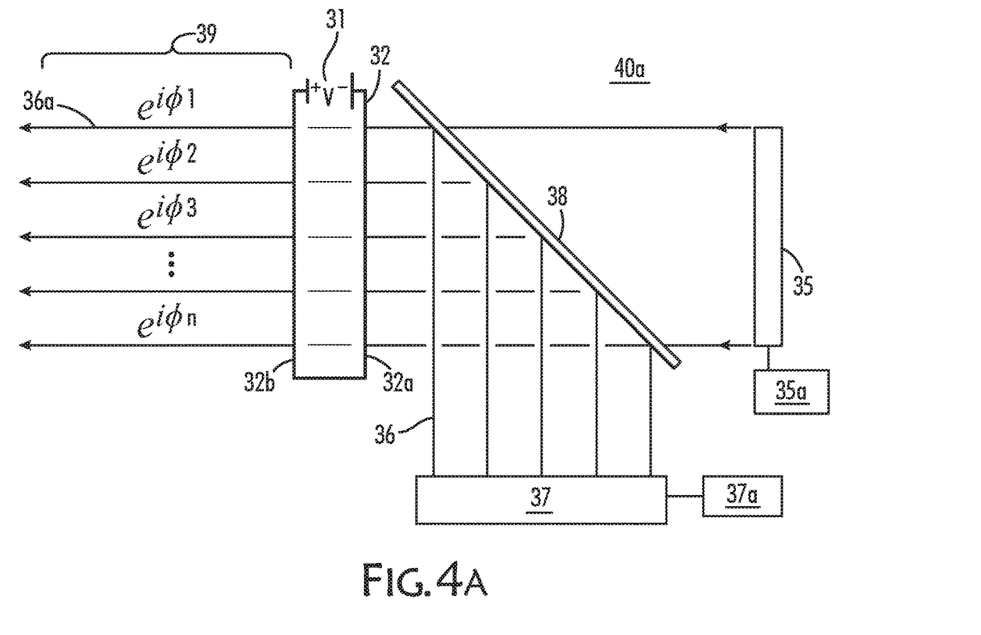
FIGS. 4A and 4B are schematic diagrams showing an aspect of the present disclosure where a plasma-containing projection device (FIG. 4A) and a solid state-containing projection device (FIG. 4B) are exclusively optically addressed and generate phase modulated beams to generate a holographic image.
Figure 4B:
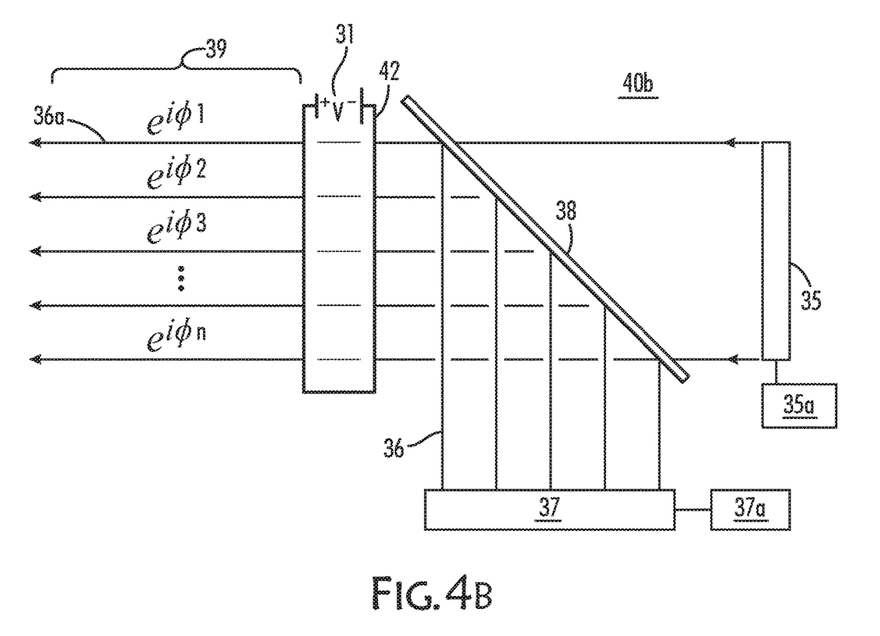

FIGS. 4A and 4B schematically present a three-dimensional projection system 40A, 40B comprising a projection device 32, 42 shown in a side view. The projection beam, or "read" beam 34 is a coherent light that can be described by the plane wave mathematical form as represented above. The projection beam 34 (emitted from a projection beam source 35) is combined with a write beam 36 addressed from an electro-optical device 37 via a frequency sensitive beamsplitter 38 that reflects the write beam frequency while transmitting the projection beam frequencies. A voltage from a voltage source 31 is applied across the projection device. It is understood that the projection device may comprise plasma in a plasma-containing device 32, or the projection device may comprise a solid state device 42 such as, without limitation, semiconductor devices comprising semiconductor materials, etc. The terms "projection beam" and "read beam" are equivalent terms for the purposes of this disclosure, and such terms are used interchangeably.

In the case of a plasma-containing projection device 40a, as shown in FIG. 4A, the write beam frequencies will interact with the plasma in the projection device 32 having a reflective back surface 32a and reflective front surface 32b, changing the local (e.g. x-y across the wavefront) values of the refractive index. This will cause slightly different optical path lengths through the plasma tube. As shown in FIG. 4, the result will be that the beam wavefront (as represented by the arrows to the left of the plasma-containing device) will each have different phase values. In other words, the values for $e^{i\phi}$ will have $\phi$ that is dependent upon its position within the wavefront as it travels to the left, away from the projection device. FIG. 4A shows a projection system of FIG. 3, now with the phase modulated beams 36a exiting the plasma-containing device 32, wherein the exiting beams converge to a point in space to form a holographic image (as perceived by a viewer as the image forms and is focused at the retina of the viewer). The holographic image, or hologram, can therefore be modulated via exclusively optically addressed information, with the information containing, for example, desired and predetermined color and color variations throughout the holographic image.

The fact that this is a coherent signal (once the $\phi$ values are established, they are constant relative to one another) means that the projected beam is a hologram. As such, it is capable of displaying objects in three dimensional representations.

FIG. 4B shows the projection system 40b, similar is all substantive ways to the projection system 40a shown in FIG. 40a, with one exception: the projection device 42 in FIG. 4B is a solid state device, replacing the plasma-containing device 32 of FIG. 4A.

Figure 5:
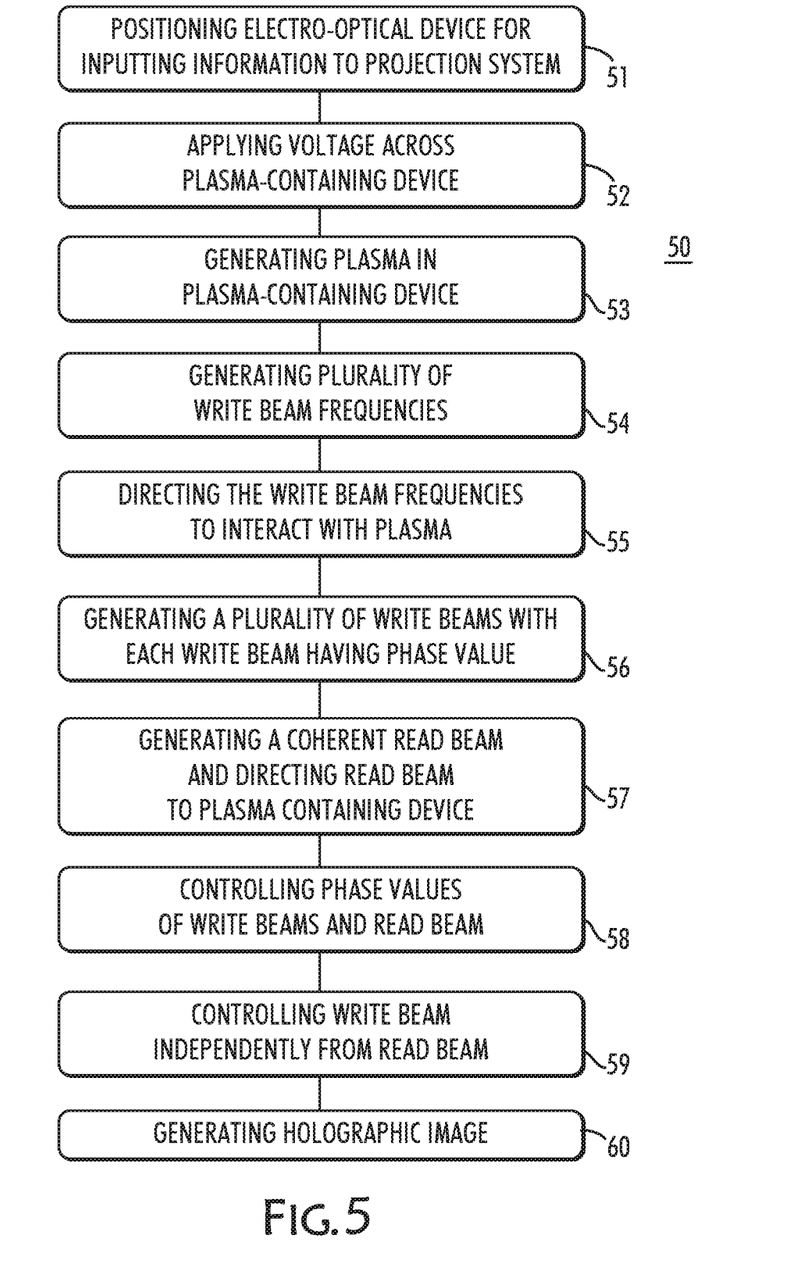
FIGS. 5 and 6 are flow charts according to aspects of the present disclosure.
Figure 6:
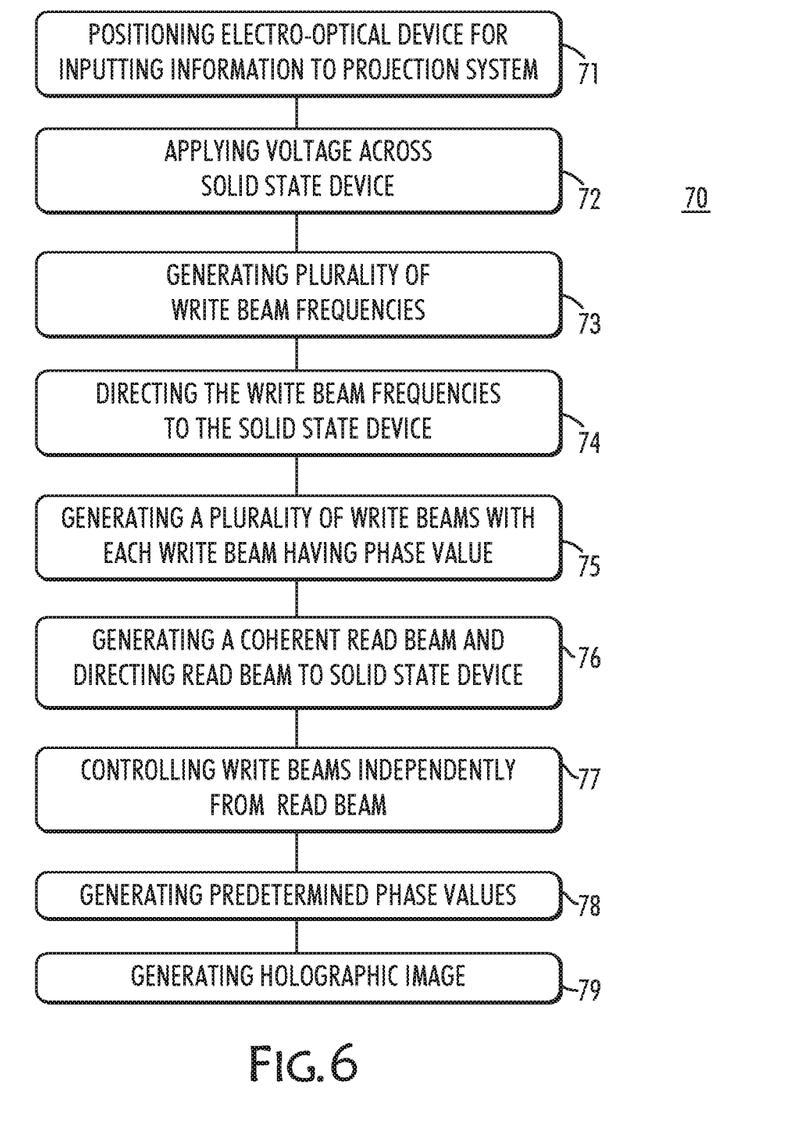

FIGS. 5 and 6 are flowcharts showing various aspect of the present disclosure. The following flowcharts disclose methods that may be used with various exemplary systems disclosed herein.

FIG. 5 is a flowchart outlining a process 50 according to an aspect of the present disclosure, whereby information that is exclusively optically addressed can be implemented to achieve high resolution three-dimensional projections, or holograms, including holograms having a predetermined color, or a plurality of predetermined colors. As shown in FIG. 5, aspects of the present disclosure are directed to a method for addressing a projection system 50 to produce holographic images comprising positioning an electro-optical device for inputting information to a projection system 51; applying voltage across a plasma-containing device 52; generating plasma in the plasma-containing device 53; generating a plurality of write beam frequencies 54; directing the write beam frequencies to interact with plasma in the plasma-containing device 55; generating a plurality of write beams with each write beam having a distinct and predetermined phase value 56; generating a coherent read beam 57; controlling phase values of write beams and read beam 58; controlling write beam independently from read beam 59; and generating a holographic image 60.

Aspects of the present disclosure further contemplate a plasma-containing device being substituted with a solid state device, such as, for example and without limitation, a semiconductor, or other non-plasma-containing solid state device, etc. As shown in FIG. 6, aspects of the present disclosure are directed to methods for addressing a projection system 70 to produce holographic images comprising positioning an electro-optical device for inputting information to a projection system 71; applying voltage across a solid state device 72; generating a plurality of write beam frequencies 73; directing the write beam frequencies to the solid state device 74; generating a plurality of write beams with each write beam having a distinct and predetermined phase value 75; generating a coherent read beam 76; controlling phase values of write beams independently from read beam 77; generating predetermined phase values 78; and generating a holographic image 79.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns, general construction object, etc. Further objects include, without limitation, atmospheric and aerospace vehicles and other objects, and structures designed for use in space or other upper-atmosphere environments such as, for example, manned or unmanned vehicles and objects, etc. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface waterborne vehicles and objects, etc.

Aspects of the present disclosure contemplate achieving exclusively optically addressable holographic images by co-aligning the write and projection beams that are then combined in an appropriate optic. The term "optic" refers to a device that transmits one beam while reflecting the other, including, without limitation a dielectric film optic. Once the beams are combined, they are propagated to the plasma device or the solid state device. Since the system is optically addressed, there is no need to "register" the combined beams with any particular location on the plasma device. The projected beam exits the plasma device and can either be projected at a screen (with suitable enlargement, if desired) or kept small in dimension for use with a smaller display such as, for example, a cockpit avionics display.

Figure 7:
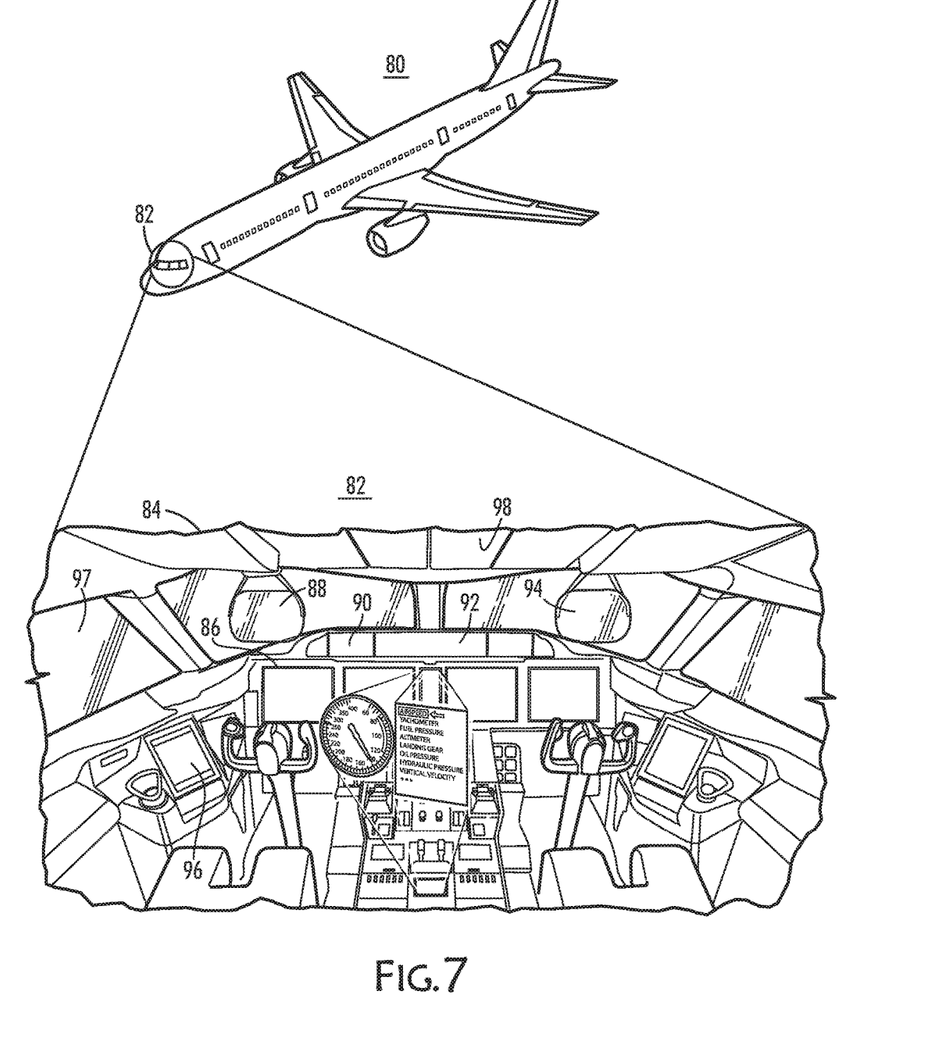
FIG. 7 is a drawing of an aircraft comprising a cockpit section having various display devices.

FIG. 7 is a drawing of an aircraft 80 with enlarged section 82 showing an internal view of a cockpit's instrument displays. As shown in FIG. 7, an aircraft 80 comprises a forward section 82. Section 82 is also shown from an interior view to contain a cockpit 84 having multiple locations for display components and display locations, with the components and locations are shown as parts and locations 86, 88, 90, 92, 94, 96, 97, 98. While it is understood that a holographic image is perceived to exist as the image is reproduced at the retina of a viewer's eye, and therefore is not formed in free space, holographic images are shown in FIG. 7 only as an illustration of where such images 100, 102 are perceived to be by a viewer in the cockpit, for example. Indeed, according to aspects of the present disclosure, in an aircraft cockpit, such as that represented generally in FIG. 7, any surface may incorporate an information display or information display location able to generate the information necessary to perceive a holographic image, or hologram, including an image display resulting from exclusively optically addressed information. Such displays may be designed to be displayed at any desired and predetermined interior or exterior surface, including, without limitation, output displays, windows, opaque surfaces, etc.

Aspects of the present disclosure contemplate plasma-containing devices used as display apparatuses. Such devices include, without limitation, plasma-based monitors, partially ionized gas-based systems, gas-discharge-based systems, etc., including support structures such as, for example, glass, etc. and combinations thereof. Further, contemplated useful structures are transparent at write and projection beam wavelengths.

Further aspects of the present disclosure contemplate write beams generated by electro-optical devices including, but not limited to, coherent sources such as, for example, lasers; partially coherent sources such as, for example light emitting diodes (LEDs); other light emitting semiconductor materials or other light sources based on Amplified Stimulated Emission, and other non-coherent sources such as, for example incandescent electro-optical sources, fluorescent sources; or thermal-based electro-optical sources, etc., and combinations thereof.

Read beams contemplated according to aspects of the present disclosure may be generated by coherent sources including, without limitation, lasers. The coherent read beam sources may be any source that provides a frequency in the visible spectrum (e.g. ranging from about 770 nm to 300 nm).

The present disclosure further contemplates voltage-generating apparatuses to provide the voltages required to generate plasma in plasma-containing devices. Such voltage generating devices include, without limitation, voltage or current based or limited power supplies, as well as any devices capable of generating useful voltages ranging from about 100 volts to about 10,000 volts, more particularly ranging from about 500 volts to about 1000 volts.

When introducing elements of the present disclosure or exemplary aspects or embodiment(s) thereof, the articles "a," "an," and "the" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method (50) for addressing a projection system (20, 30, 40*a*) comprising the steps of:
    positioning (51) an electro-optical device (25, 37) for inputting information to a projection system device, the projection system device comprising a plasma-containing device (22, 32);
    applying (52) a voltage generated by a voltage-generating device (24, 31) across the projection system device;
    generating (53) plasma in the plasma-containing device;
    generating (54) a write beam having one or more write beam frequencies (26, 36) from the electro-optical device (37);
    directing (55) the write beam to the plasma-containing device;
    modifying a phase of local values of an index of refraction of the plasma according to information exclusively optically addressed by the write beam;
    generating (57) a coherent read beam (34) from a coherent read beam-generating source (35);
    directing the read beam to the plasma-containing device; and
    generating (60) a holographic image (100, 102) as the modified phase of local values of the index of refraction of the plasma modulates the local phase of the coherent read beam.

2. The method of claim 1, wherein the information is exclusively optically addressed to the projection system device via the write beam.

3. A holographic image generated according to the method of claim 1.

4. The method of claim 1, wherein the electro-optical device is a laser and the write beam is emitted from the laser.

5. The method of claim 1, coincidently with the step of generating a holographic image, further comprising: optically addressing information, the information assigning different colors to the hologram by modulating the different write beam frequencies in phase separately in the wavefront.

6. A holographic image generated according to the method of claim 5.

7. A projection system (20, 30, 40) comprising:
    a projection device comprising a plasma-containing device (22, 32);
    an electro-optical device (25, 37) configured to input information to the projection device by generating a write beam (26, 36) having one or more write beam frequencies and exclusively optically addressing information to the plasma-containing device by modifying a phase of local values of an index of refraction of the plasma;
    a voltage-generating source (24, 31) in communication with the plasma-containing device;
    a coherent read beam source (35) configured to generate a coherent read beam and direct the coherent read beam to the projection device;
    a first controller (37*a*) configured to control the write beam; and a second controller (35*a*) configured to control the read beam, the second controller configured to operate independently from the first controller;

wherein information is exclusively optically addressed from the electro-optical device to the plasma-containing device, with the exclusively optically addressed information configured to generate a holographic image (100, 102) as the modified phase of local values of the index of refraction of the plasma modulates the local phases of the coherent read beam.

8. The system of claim 7, wherein the electro-optical device is a laser and the write beam is emitted from the laser.

9. The system of claim 7, wherein exclusively optically addressed information is configured to assign color to the holographic image.

10. An object comprising the system of claim 7.

11. The object of claim 10, wherein the object is a stationary object.

12. The object of claim 10, wherein the object is a vehicle.

13. The vehicle of claim 12, wherein the vehicle is selected from the group consisting of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned water borne surface vehicle; a manned sub-surface water borne vehicle; an unmanned sub-surface water borne vehicle, and combinations thereof.

* * * * *